United States Patent
Wheeler

(10) Patent No.: US 8,973,116 B2
(45) Date of Patent: Mar. 3, 2015

(54) PATTERN ENTROPY PASSWORD STRENGTH ESTIMATOR

(71) Applicant: Dropbox, Inc., San Francisco, CA (US)

(72) Inventor: Dan Lowe Wheeler, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 70 days.

(21) Appl. No.: 13/720,738

(22) Filed: Dec. 19, 2012

(65) Prior Publication Data

US 2013/0269010 A1 Oct. 10, 2013

Related U.S. Application Data

(60) Provisional application No. 61/622,508, filed on Apr. 10, 2012.

(51) Int. Cl.
G06F 7/04 (2006.01)
G06F 15/16 (2006.01)
G06F 17/30 (2006.01)
H04L 29/06 (2006.01)
G06F 21/46 (2013.01)

(52) U.S. Cl.
CPC ..................... *G06F 21/46* (2013.01)
USPC .......................................................... 726/6

(58) Field of Classification Search
CPC ...................................................... G06F 21/46
USPC .......................................................... 726/6
See application file for complete search history.

(56) References Cited

U.S. PATENT DOCUMENTS

2009/0157588 A1* 6/2009 Jivsov .............................. 706/48
2011/0314294 A1* 12/2011 McGrew et al. .............. 713/182

OTHER PUBLICATIONS

A Note on Proactive Password Checking Jianxin Jeff Yan © 2001.*
Compression of Low Entropy Strings with Lempel—Ziv Algorithms S. Rao Kosaraju Giovanni Manzini © 1998.*

* cited by examiner

*Primary Examiner* — Kambiz Zand
*Assistant Examiner* — Benjamin Kaplan
(74) *Attorney, Agent, or Firm* — Novak Druce Connolly Bove + Quigg LLP

(57) ABSTRACT

A password evaluation system is provided for determining the password strength of a password. A password is provided for evaluation. The password is parsed and substrings are identified from the password. Each substring is associated with a pattern that can generate the substring. The substrings are scored to determine a substring strength measure for the substring. The substrings are combined to identify non-overlapping substring combinations, which together make up the password. The combinations are assigned a combination strength score based in part on the substring strength of the substrings contained in the substring combinations. The substring combination with the lowest combination strength measure is identified and the associated combination strength measure is used as the password strength measure for the password.

15 Claims, 4 Drawing Sheets

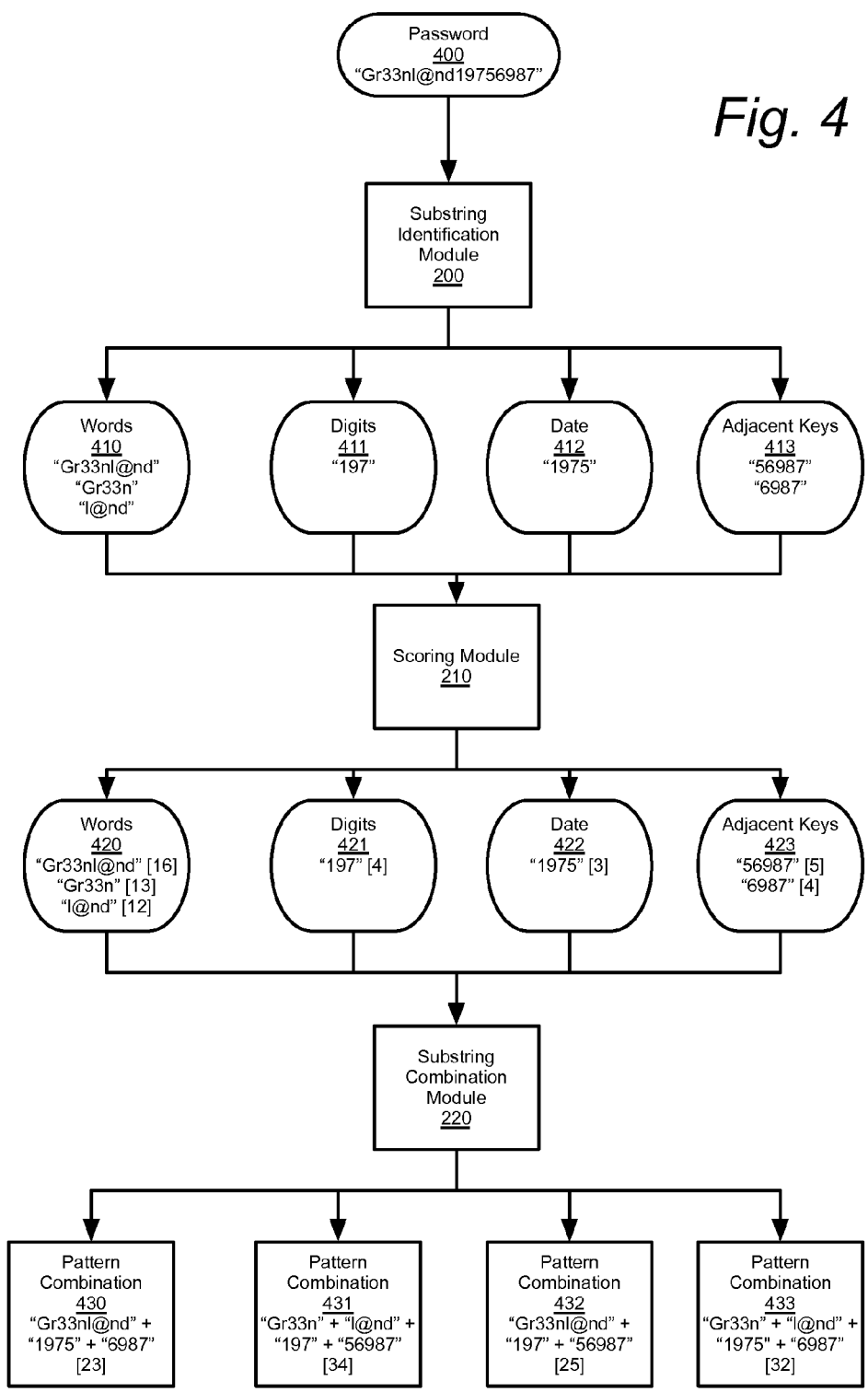

PATTERN ENTROPY PASSWORD STRENGTH ESTIMATOR

CROSS REFERENCE TO RELATED APPLICATIONS

This application claims the benefit of U.S. Provisional Application No. 61/622,508, filed Apr. 10, 2012, which is incorporated by reference in its entirety.

BACKGROUND

1. Field

Described embodiments relate generally to determining a password's strength and in particular to identifying the strength of patterns within a password.

2. Description of the Related Art

One security risk for online systems is the strength of a user's password. In many systems, passwords are stored as a hash of the password resulting from a hash function. A hash function is any algorithm or subroutine that maps large data sets of variable length, to smaller data sets of a fixed length. For example, a person's name, having a variable length, could be hashed to a single integer. The values returned by a hash function are called hash values, hash codes, hash sums, checksums or simply hashes. Given access to the hash and the hash function, the security of the account depends on the inability of an adversary to identify the password from the hash and the function. To make to it more difficult for adversaries to obtain passwords, many systems provide a password strength calculator that estimates the strength of a proposed password, on the assumption that a user will select a password that the calculator indicates as being higher strength.

One conventional way of approximating password strength is by estimating an amount of time that an adversary would take to determine the password if the adversary had access to the hashed password and hash function. This in turn is generally determined by the number of passwords an adversary would need to attempt before obtaining the password by trial and error by entering the passwords into the hash function. Since the hash function is generally chosen to take a non-negligible amount of time to provide a hash result, this approach assumes that a large number of attempts indicates a stronger password. That is, if the amount of time required to complete a large number of attempts exceeds the amount of time an adversary is likely to spend on an individual attack, then the password is determined to be a stronger password. Another way in which systems rate password strength is using simple rules such as the number of unique characters or the use of special characters.

However, since many users choose passwords that contain common patterns such as number-word-symbol, an adversary who attempts to break a password using patterns has a significantly higher chance of success. As a result many conventional password strength calculators will overestimate the strength of passwords by failing to recognize such patterns.

SUMMARY

A system, method, and storage medium provide password strength metrics based on a measure of entropy of passwords, and provide improved ratings to users that better indicate the strength of passwords based on such entropy measures.

A password strength module receives a password from a user and determines the password strength of the password. The password strength module identifies substrings within the password, and identifies substring combinations that form the password using the substrings. Given a substring in a combination, the module determines whether the substring can be generated from one or more patterns. A substring strength of the substring is a function of the total number of substrings that can be generated from a pattern that matches the substring, which is a measure of the entropy of the pattern. Various patterns are considered for generating substrings, such as keyboard patterns, common passwords, and dictionary words. The substring strength for each pattern type may be determined based on a variety of factors. For example, for keyboard patterns, keyboard layouts are accessed and combinations of characters that could be generated based on the length of the substring and the number of turns on the keypad based on the direction of a user's actions on the keys are considered to determine the types of substrings that can be generated. For dictionary patterns, the frequency of use of the dictionary word in the substring is used to dynamically select a size of dictionary appropriate for the size of dictionary necessary for selecting the substring. Dictionary patterns are also modified based on capitalizations and substitutions within the dictionary word. The combination strength of each substring combination is determined based at least in part on the string strength of the substrings in the substring combination. The password strength is determined as the minimum of the combination strengths, since the substring combination with the lowest strength indicates the substring combination that would most readily allow an adversary to determine the password. Using the password strength of the password, various actions can be taken by the password strength module, such as providing an output measure indicating the relative strength or weakness of the password, or rejecting or allowing the password to be used in the system. The password strength module may also provide one or more suggested passwords to the user to improve the measure of password strength of the password based on the pattern types identified in the password.

BRIEF DESCRIPTION OF THE DRAWINGS

FIG. 4 illustrates the processing of a password 400 to determine the password strength according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
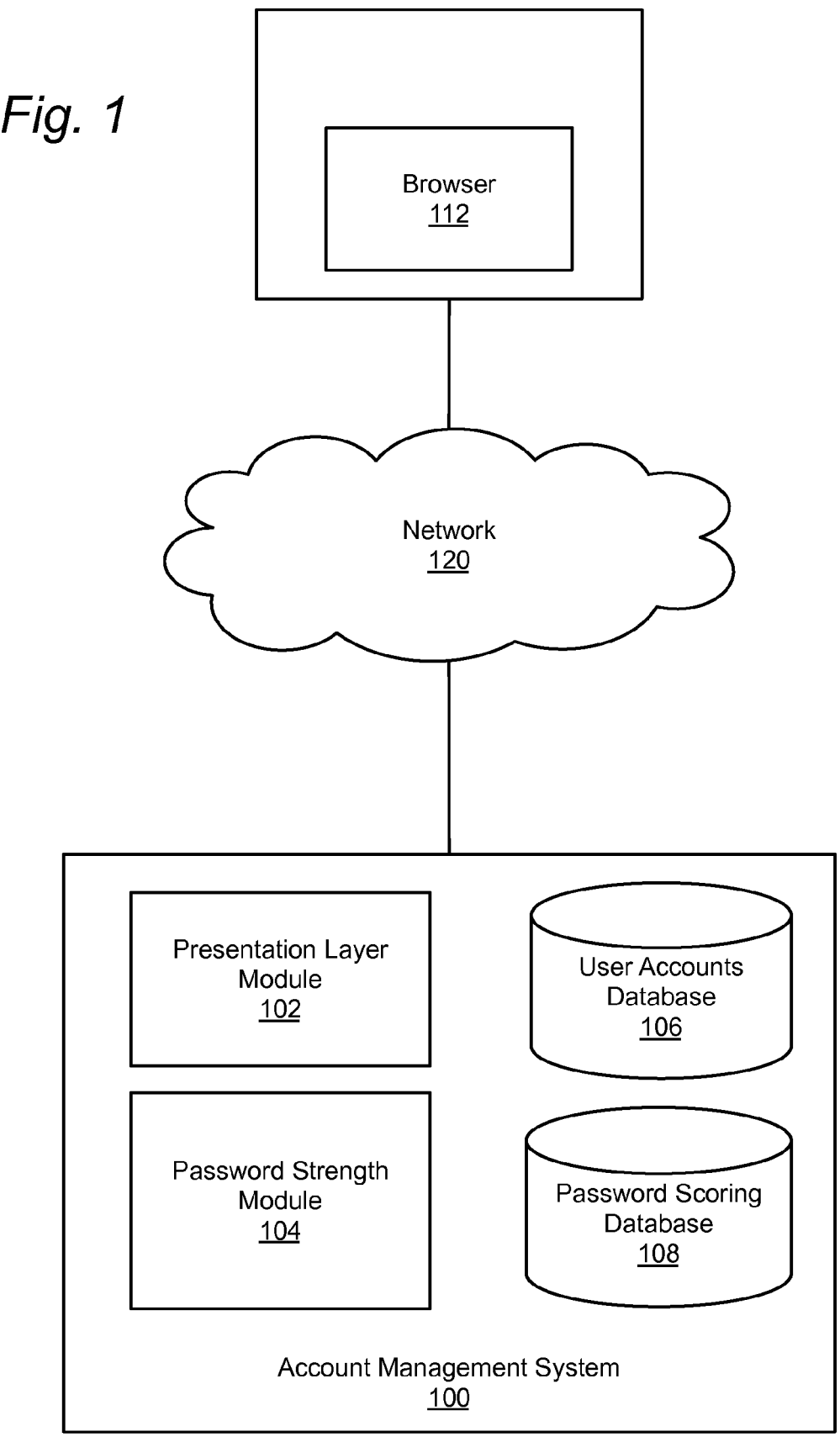
FIG. 1 illustrates an account management system 100 according to one embodiment.

FIG. 1 illustrates an account management system 100 according to one embodiment. The account management system 100 may be implemented as a separate system or may be an account management subsystem within a larger content system. For example, the account management system 100 may provide account set up and authentication services for banking, commerce, website, and other systems which have a need for secure user log-in procedures, and in particular a need for secure passwords that are difficult to defeat by automated attacks. The account management system 100 may allow users to establish accounts with the account management system 100 and enables users to select a password for accessing the account. The account management system 100 provides feedback to users to indicate the relative strength of a user's password. As such, the account management system 100 assists users in selecting a password that is difficult to determine by either automated or manual methods.

A user device 110 communicates with the account management system 100 to manage a user's account with the account management system 100. The user device 110 is a computing device suitable for communicating with the account management system 100 and may be any such system. Examples of a user device 110 include a desktop computer, a laptop computer, a tablet, a mobile telecommunications device (e.g., smartphone), a set-top box, a kiosk, a video game system, and any other system capable of communicating with an account management system 100 for managing a user's account. The user device 110 can include a browser 112. The browser 112 is a module that enables the user device to retrieve and view content from the account management system 100. The user device can also include a dedicated client application for accessing the account management system 100. Other methods for communicating with the account management system 100 may also be used by the user device 110.

The account management system 100 in this embodiment includes a presentation layer module 102, a password strength module 104, and a database 106. The account management system 100 includes further modules and components in various implementations, which may include systems for providing accessible content to a user device after a successful login.

The presentation layer module 102 provides an interface for the user device 110 to interact with the account management system 100 according to appropriate communication protocols for the user device 110. In one embodiment, the presentation layer module 102 provides browser instructions and scripting instructions for execution using a web browser of the user device 110. In additional embodiments, the presentation layer module 102 may interface with the dedicated client application or other communication methods used by the user device 110.

The presentation layer module 102 provides an interface for the user to modify account settings in the account management system. In general, account settings may include personal information of the user, such as name, address, telephone numbers, and so forth, which are not material to the present embodiment, and will vary in most implementations. For the purposes of this embodiment, the account settings include the user's password. As a part of the password selection process, the presentation layer module 102 receives a password from the user device 110. The presentation layer module 102 provides the password to the password strength module 104 to determine the strength of the password. The presentation layer module 102 receives a measure of the password's strength from the password strength module 104 and returns the measure to the user, either directly or in some modified form (e.g., textual, graphical, auditory). As will be apparent from the description below, the operations of the account management system 100 generally, and the password strength module 104 particularly, are sufficiently complex and time consuming as to necessarily require their practical implementation by a computer system, and therefore cannot be effectively performed in the human mind in a timely manner by mere mental steps.

The password strength module 104 receives a password and determines a measure of the password strength of the password based on a measure of entropy of its substrings, and is one means for performing this function. The password strength module 104 analyzes the password to decompose the password into a several combinations of substrings. The substrings correspond to patterns. Patterns are based on repetitive alphanumeric sequences, common number-letter substitutions, sequences corresponding to keyboard layouts, and common English words. Thus, each substring combination represents one combination of patterns that an attacker may use to identify the password. Each pattern has a measure of entropy, and the measure of entropy of a given password is based upon the substring combination that has the lowest measure of entropy. The measure of entropy for a substring combination may be calculated based on the total number of possible passwords that can be generated by the substring combination and may be modified based on the frequency that the actual password is generated using the substring combination. The measure of entropy for the substring combination is determined as a function of the total number of possible passwords. One measure of the entropy is the log (base 2) of the number of passwords generated by the patterns that can generate each of the substrings in the combination. The number of possible passwords is generated based on the patterns within the substring combination, such as a substring combination generated with a {word, word, number} pattern. Each substring in the substring combination is assessed to determine a measure of entropy for the substring, and an additional measure of entropy may be added for the various ways to combine the substrings.

As used in this disclosure, "password strength" refers to a measure of the strength of a password, "combination strength" refers to a measure of the strength of a particular combination of substrings, and "substring strength" refers to a measure of the strength of a particular substring within a password.

Thus, the password strength module 104 identifies substrings within the password, scores the entropy for each substring based on the number of substrings generated by a pattern, combines the identified substrings, and selects the identified combination with the minimum entropy.

For example, consider the password "qwerode." This password includes the substring combinations "qwe"+"rode" and "qwer"+"ode." An attacker can successfully determine this password by trying a combination of keyboard patterns including sequential keyboard characters ("qwe" or "qwer") and English words ("rode" or "ode"). The combination of English words and a short keyboard pattern may produce many types of possible passwords. By determining the measure of entropy of "qwe-rode" and comparing it against the entropy of "qwer-ode," the pattern combination that is easier for an adversary to attempt is identified and measured.

Each substring combination is assessed by the password strength module 104 to determine a measure of combination strength, and subsequently of password strength, which can be represented numerically, as well as textually, graphically, or otherwise. The combination strength for a substring combination is based on the measure of entropy of each substring and in some embodiments the order of the substrings in the combination. The order of the substrings is the sequence of the substrings within the combination. For example, a password made up of a word substring and a number substring may be ordered {word, number} or {number, word}. The order of substrings provides an additional measure of entropy to the substring combination.

Using the combination strengths associated with the substring combinations for the password, the password strength module 104 determines the password strength by selecting the weakest combination strength associated with the substring combinations.

The user accounts database 106 maintains information relating to the user accounts. The user accounts database 106 stores usernames, passwords, and various user data according to the system implementing account management system 100. For example, user accounts database 106 may additionally store purchase history and billing information when the account management system is included in a commerce system. The password chosen by the user is stored with the user's account in the user accounts database 106.

The password scoring database 108 stores data for execution of functions by the password strength module 104. The information stored for the password strength module 104 includes information and data relevant for the password strength module 104 to identify substrings within a password and calculate measures of password strength. This data may include possible characters used in a password, keyboard layouts, common key substitutions, dictionaries, commonly used passwords, and other such information as described below. The operator of the password scoring database may identify and input this information to the password scoring database 108, or the password scoring database may be provided certain types of information by the password strength module 104. For example, common passwords and key substitutions may be updated to the password scoring database 108 based on actual common password or key substitutions identified by user behavior. However, since such analytics may require retention of password inputs, and associated risks of security breaches, such information may be input by the operator based on publically available information.

A keyboard layout is a representation of particular placement of keys on a keyboard, such as the QWERTY or Dvorak keyboard layouts. The keyboard layout in the database 108 is stored as a graph of nodes representing each key and connections between the nodes representing adjacent keys on the keyboard. Since user devices use a variety of different keyboard layouts, a password may be entered using any of these layouts. These various keyboard layouts are stored in the password scoring database 108. As such, the stored keyboard layouts include particular keyboard layouts for various types of mobile devices and other specialized interfaces. Certain keyboard layouts may also enter different keys using a function key or using repeated strokes. For example, a QWERTY keyboard may allow a user to enter a 3 or a # on the same key, or a phone keypad may enter a D, E, or F on the same key, depending on the number of times the key is pressed.

The network 120 enables communications between account management system 100 and user device 110. In one embodiment, the network 120 uses standard communications technologies and/or protocols. Thus, the network 120 can include links using various communication models, such as protocols consistent with the OSI model, including various layers such as physical, data link, network, transport, session, presentation, and application layers. The data exchanged over the network 120 can be represented using technologies and/or formats including the hypertext markup language (HTML), the extensible markup language (XML), and other formats. In addition, all or some of the links can be encrypted using conventional encryption technologies such as secure sockets layer (SSL), transport layer security (TLS), virtual private networks (VPNs), Internet Protocol security (IPsec), and other encryption techniques. In another embodiment, the entities can use custom and/or dedicated data communications technologies instead of, or in addition to, the ones described above.

Embodiments of the invention include determining the password strength at any computing device, such as the account management system 100 or on the user device 110. In one embodiment, rather than determine the password strength at account management system 100, the password strength is determined at the user device 110. For example, the user device may execute a script in browser 112 that implements the functions of password strength module 104 and includes components of password scoring database 108. In another embodiment, the user device 110 may determine the password strength without an account management system 100. For example, the user device 110 can execute a password strength determination for an Internet browser or in a plug-in for an Internet browser. This may allow a user to determine a password strength for passwords entered in fields at a web page, and may automatically identify fields likely to be passwords, such as by identifying terms typically associated with a user entering a new password to a website, such as fields named "current password" followed by "new password" on a page. The string entered into the "new password" field may be identified and assessed to determine the string's password strength. In these ways, the password strength determination can be performed by a variety of computing device in a way to provide feedback on the user's password.

Substring Pattern Identification

Figure 2:
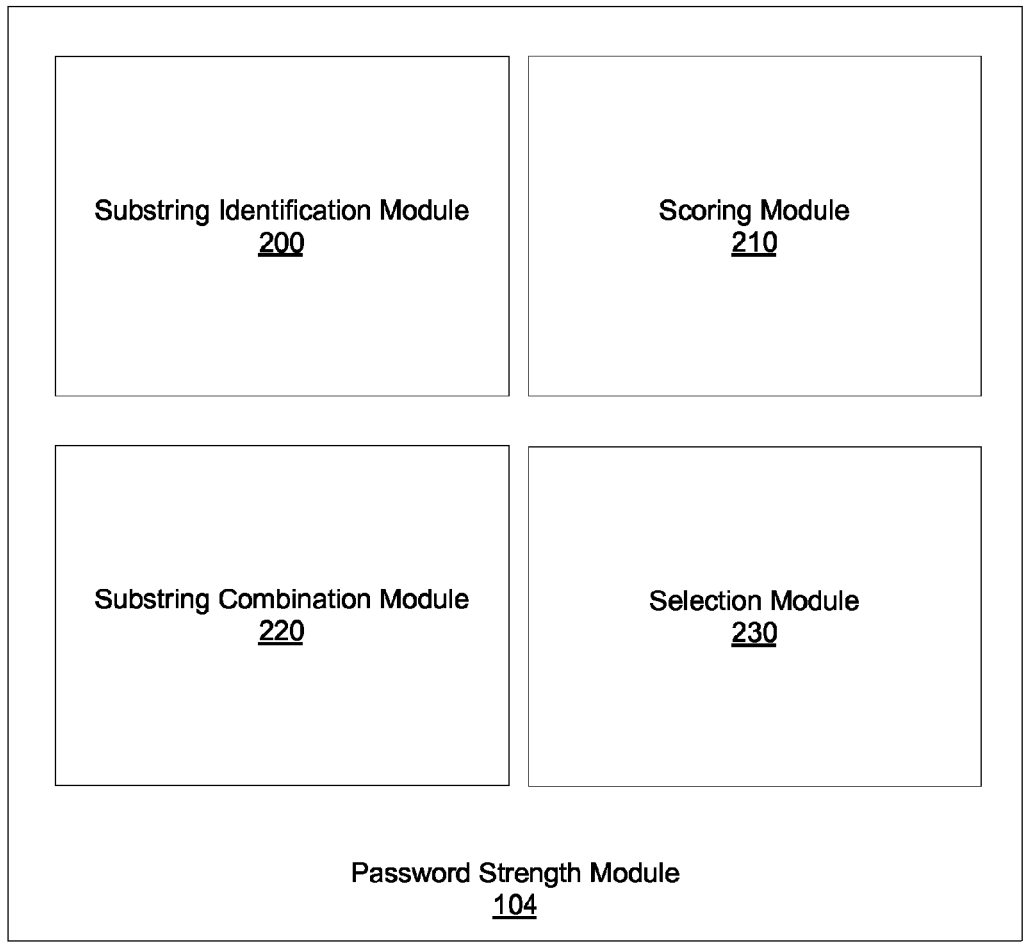
FIG. 2 illustrates password strength module 104 including various modules according to one embodiment.

FIG. 2 illustrates password strength module 104 includes various modules according to one embodiment. Password strength module 104 includes a substring identification module 200, a scoring module 210, a substring combination module 220, and a selection module 230. Using these modules, the password strength module 104 determines the measure of password strength.

The substring identification module 200 identifies substrings within the password. The password is parsed into substrings for each combination of sequential characters within the password. For example, the password "BAD" has substrings B, A, D, BA, AD, and BAD. The substring identification module 200 determines whether each substring matches any patterns stored in the password scoring database 108. Patterns, which can be identified by substring identification module 200, may vary according to the implementation. For example, in one embodiment the substring identification module 200 identifies patterns such as common passwords, common first names, common surnames, words, keyboard patterns, repetitive keystrokes, years, and dates. The various patterns are described in further detail below, and are generally stored in the password scoring database 108. The type of patterns identified by the password strength module 104 may include any further pattern types as desired. In particular, the types of patterns identified by the password strength module 104 may be updated to include any patterns or variations that have become prevalent in use. In addition to these identified patterns, when no pattern is identified for a string, the pattern is identified as a "brute-force" pattern, indicating that the substring is generated as an arbitrary combination of characters.

The substrings identified by the substring identification module 200 may overlap. In particular, substrings that are identified as being generated by a pattern may overlap. For example, the password "damnation" can be identified to contain several overlapping substrings that correspond to words: "damnation," "dam," "nation," "damn," "at," and "ion."

To identify substrings as belonging to a word-based or dictionary-based pattern, the substring identification module 200 compares the substrings to a set of words. The set of words is stored in the password scoring database 108. For example, to determine if a substring is a most frequently used password, the substring is compared against the list of common passwords stored in the password scoring database 108. The list of common passwords can be obtained from publicly available sources, internally from account management system 100 itself, or a combination thereof.

The substrings may also be generated from common number-letter substitutions. For example, passwords may commonly replace an "e" with a "3", an "a" with a "4" or an "@", an "l" with "1", and an "o" with "0", and so forth. These substitutions may be made to the substrings to determine if the substring is a word with a substitution. Identification of patterns such common passwords, common names, common surnames, and words may be identified using this method.

Identification of patterns such as dates and repetitive keystrokes for a substring is performed using regular expression matching. Such regular expression matching is well known in the art, and enables the system to identify patterns using a regular expression such as (aba*) to identify a string starting with "ab" with any number of subsequent "a" characters, such as "ab" or "abaaaaa."

To identify a keyboard pattern, the substring identification module 200 accesses the password scoring database 108 to obtain keyboard layouts. The substring identification module 200 may use the keyboard layout used by a user, or may attempt to identify a pattern using each of the keyboard layouts in the database 106. To determine whether there is a keyboard pattern, the substring identification module 200 selects a keyboard layout from the password scoring database 108. As described above, the keyboard layout is stored as a graph with nodes, each node indicating a character and including connections to nodes adjacent to the node in the keyboard layout. The substring identification module 200 begins at the node corresponding to the first character of the substring. Next, the substring identification module 200 identifies the nodes connected to the first character's node and determines whether the connected nodes correspond to the subsequent character in the substring. The substring identification module 200 continues to determine if subsequent characters in the substring are connected to preceding nodes in the keyboard layout. If all characters in the string are connected, then the substring is identified as a keyboard pattern. After determining whether the substring can be generated by a pattern for a particular keyboard layout, the next keyboard layout is used to determine if the substring could be generated from the next keyboard layout.

In one embodiment, the nodes are treated as connected even if the nodes are not immediately connected. Instead there may be hops over nodes in the graph to identify connected keys. The number of connections traversed to reach the desired key is calculated and stored as an adjacency score. The adjacency of two keys is determined by the number of keys between the two keys. For example, a QWERTY keyboard layout may store nodes for G and H keys as connected with an adjacency score of 1, while G and K may have an adjacency score of 3. In addition, the actual layout may be indicated by maintaining information on the directionality of the connection between two nodes. For example, the G key on a QWERTY keyboard is connected on the left to the F key, to the right to the H key, above to the T and Y keys and below to the B and V keys. For keys that are not adjacent to one another, a list or several lists of keys that connect the keys along a path may be indicated. Additional metrics may also be used to determine adjacency scores. For example, such additional metrics may determine whether the keyboard pattern is typed on a keyboard pattern by keys associated with one hand or with two hands.

Using the adjacency score of individual keys, the maximum adjacency score of the substring is also identified and stored. For example, in the "qwerty" keyboard layout, a substring "qwru" has an adjacency score of 1 between "q" and "w," an adjacency score of 2 between "w" and "r," and an adjacency score of 3 between "r" and "u." The highest adjacency score in this string, 3, is stored as the maximum adjacency score of the substring.

The system may use the maximum adjacency score for recognizing a pattern. In this example, if the adjacency score for recognizing a pattern is set to 3 or higher, this substring, "qwru," will be recognized as a keyboard pattern with a maximum adjacency score of 3. If the maximum adjacency score for recognizing a pattern is set to 2, then "qwru" is not recognized as a pattern because "r" to "u" has an adjacency score of 3.

In addition to adjacency score, the substring identification module 200 may also identify the number of turns in a keyboard pattern. A turn is a change in the physical direction in which the user has to enter the keys, from horizontal to vertical, vertical to horizontal, a reverse in direction, and other changes possible on the physical layout of the keyboard. The number of turns in a pattern indicates the number of changes in direction a user may make on the keyboard when typing the pattern. For example, consider a standard 1-9 keypad arranged in three rows: 1-2-3, 4-5-6, 7-8-9. A user may type a password using adjacent keys and changing direction at each key to create a substring of "14589." The substring identification module 200 identifies this pattern as a keyboard pattern described as 5 digits with a maximum adjacency score of 1 and 3 turns. In one embodiment, the initial direction of the first two keys (from 1 to 4 in this example is also treated as a turn.

Substring Strength

Using the patterns, which can generate the substrings, the scoring module 210 determines the indication of substring strength for each substring. The indication of substring strength is determined for each substring using the pattern that can generate the substring. The patterns may be a word with substitutions, a keyboard pattern, a date, and other variations of the pattern that was used to identify the substring. For example, for a substring such as "Gr33nl@nd," the pattern to generate the substring is the dictionary word "Greenland" with capitalization and number-letter substitutions. Using the pattern identified with the substring, the scoring module 210 determines the number of sub strings that could be generated by the pattern. The entropy is determined based in part on the number of substrings that could be generated by the pattern, though variations and other measures of substring strength may be used as described below.

For substrings generated by keyboard patterns, the entropy is calculated based on the number of possible combinations of keys that could be generated by the same pattern. The pattern is defined by the average number of adjacent keys d, the length of the pattern i, the number of turns j, a starting character s, and the maximum adjacency score of the keys. The number of turns in one embodiment includes the initial "turn" to determine a direction from the first key. An approximation of the entropy may be calculated for the number of combinations by treating the keyboard generally as a selection of j turns within the length i, where the possible turns are controlled by the average number of adjacent keys. For a keyboard pattern with a maximum adjacency score of 1, this approximation of the number of combinations for a keyboard pattern is given by Equation 1

$$\binom{i-1}{j-1} sd^j \qquad \text{Equation 1}$$

where (i−1) choose (j−1) counts the possible configurations of turns for a pattern with a length i and with j turns. In this embodiment, the original directionality of the pattern on the keyboard is not treated as a turn. However, an adversary may try patterns with a shorter length and fewer turns than the actual pattern. As such, the simpler patterns an adversary may try are also included as possible combinations. The simpler patterns are patterns with a shorter length or with fewer turns. To calculate the total number of such patterns, the sum of such patterns is calculated according to Equation 2:

$$\sum_{i=2}^{L} \sum_{j=1}^{min\, t, i-1} \binom{i-1}{j} sd^j \qquad \text{Equation 2}$$

wherein L is the maximum length (typically the actual substring length) and t is the maximum number of turns (typically the actual number of turns in the substring pattern). Using Equation 2, the approximate total number of combinations can be identified. Equation 2 illustrates the calculation of the total number of combinations where the key patterns are adjacent to one another. In other embodiments, the combinations for patterns with higher adjacency scores are also calculated. Such calculations can be performed by increasing the average number of adjacent keys d. Since the number of keyboard sequences is finite, the system may also pre-determine the possible combinations for each length-turn-adjacency combination and store the possible combinations in a look-up table.

For substrings that can be generated by dictionary words, the measure of entropy for the substring is based on the word's frequency in a dictionary and any applicable character substitutions. The frequency of a word's use is considered because a frequently-used word in a password enables an adversary to determine a password with a smaller dictionary size and thereby attempt fewer dictionary words. For an adversary to identify an uncommon or rare word requires the adversary to use a larger dictionary of words. The relative frequency of words can be determined based on occurrence of the word in various dictionary sizes, or the relative frequency of words may be identified by the frequency of words in popular use. Popular use may be determined for example by the frequency with which words appear in books, newspaper, television, and film. As such, the measure of entropy of a word in one embodiment is based on an adaptive sizing of the dictionary. The dictionary sizing is used to determine possible words that may be tried by an adversary and defines the number of pattern combinations that may be attempted.

The measure of entropy and number of words generated by the pattern may also be increased by the selection of substitutions and capitalizations. For capitalization, common capitalizations may be treated as special cases. For example, capitalization of the first letter alone provides two variants of a word, one with the capitalization and one without. As such it doubles the number of variants to be tried into one version with a capitalization, and one version without. Therefore this special case increases the entropy of the word by one. For the general case, the number of uppercase letters u in the substring is considered relative to lowercase letters l. The number of combinations for a substring with mixed uppercase u and lowercase l characters is given by Equation 3:

$$\sum_{i=1}^{min(u,l)} \binom{u+l}{i} \qquad \text{Equation 3}$$

As such, the number of substrings for the particular pattern that can generate the substring being evaluated and the substrings that simpler patterns generate, which would not generate the substring, are included as possibilities an adversary may try. The intuition is that an adversary will try a simpler pattern before attempting more complex patterns. As described above with respect to the keyboard sequence, the combinations matching the particular pattern of the substring is added to combinations of simpler patterns an adversary may use before attempting the pattern that actually generates the substring. The substring strength measure is determined using the number of substrings that can be generated by the pattern.

For a substring generated by common names, common surnames, and common passwords, the calculation of the number of substrings generated by a pattern is described with respect to general dictionary words. For each type of pattern (name, surname, password), the applicable dictionary is selected, which may include a rank for the substring relative to various dictionary sizes and frequency of occurrence. In addition, user-specific information may be included for the calculation of the number of substrings generated by the pattern. For example, a user's name, address information, and other data may be stored with a user's account. Such information may be used by lazy users to determine a password. By adding the user-specific information to a dictionary of common passwords, the system can reduce the entropy score of the password to account for the possibility a user includes such information in the user's password.

For a substring generated by a "brute-force" pattern, the number of substrings generated by the pattern is calculated using the number of possible combinations of characters of the substring length. The number of possible combinations is determined based on the number of characters in the substring and the number of possible characters that may be entered for each character of the password. As such, the number of substrings is the number of possible characters to an exponent defined by the number of characters in the substring. For example, the number of substrings for a three character string where the character set includes lower- and upper-case letters is $52^3$ or 140608 substrings.

For dates and years, the number of combinations is calculated based on a range of dates and years likely to be tested by an adversary. For example, the date may be assumed to range between January 1 and December 31 of a year, while the years are selected from a range of years likely chosen by users. For example, most typical years used in a password are personally relevant to the user, and therefore may be a birth year, a year the user was married, or tied to other significant events. Thus, the year range is typically near in time to the current year, and ranges in one embodiment from 1900 through 2019. For example, the possible substrings generated for dates may be a date including a month, day, and year from the 12 months, 31 days, and years 1900 through 2050. The choice of 1900 through 2050 is determined by the account management system 100, and represents common years chosen by users based on the frequency the users choose these dates.

Using the number of combinations generated for the various types of substrings, the measure of entropy is calculated by determining the base 2 logarithm of the number of combinations.

Substring Combination Strength

The substring combination module 220 uses the scored substrings to determine combinations of the substrings that compose the full password string. Since the patterns identified in the password may overlap with one another, various combinations of substrings are determined that compose the password. The substring combination module 220 identifies combinations of the substrings that do not overlap. To identify the combinations of substrings, the combination module 220 may identify which substrings may be added to a string and match characters in the entered password. Each combination of substrings that together are the password string is selected as a combination of substrings.

After identifying the substring combinations, the substring combination module 220 also determines the number of generated passwords resulting from the various substring combinations. The additional generated passwords of the combinations account for variations in selecting and arranging the patterns used to generate substrings. For example, a password described by a {word, word, date} substring combination is comprised of the same substrings as a password described by a {word, date, word} substring combination, but the arrangement of each substring combination provides further generation possibilities. In one embodiment, no further combinations are calculated for the arrangement of the patterns, and the combinations are assigned a number of combinations by multiplying the number of combinations of the constituent substrings.

In one embodiment, combination strength based on the arrangement of substrings is determined with reference to a frequency rating of various substring combinations. The frequency rating is determined based on lists of frequent or common passwords and can identify the frequency that particular substring combinations are used. For example, such frequency rating may indicate that {word, word, number} is more common than {number, word, word}.

Using the number of passwords that can be generated by the patterns for each substring combination, a measure of combination strength is determined for each substring combination. In one embodiment, the measure of combination strength is determined based the entropy for each substring added to an entropy for the arrangement of the substrings. The entropy for the arrangement of the substrings is based on the number of ways the substrings can be combined. The measure of combination strength is assigned to each substring combination.

The selection module 230 selects and reports a substring combination as the final password strength measure for the password. The selection module 230 identifies the substring combination with the lowest combination strength and reports the combination strength associated with the lowest combination strength as the password strength. The lowest combination strength substring combination is the combination of attempted patterns that if tested by an adversary presents the fewest number of alternative passwords to attempt before identifying the password.

Figure 3:
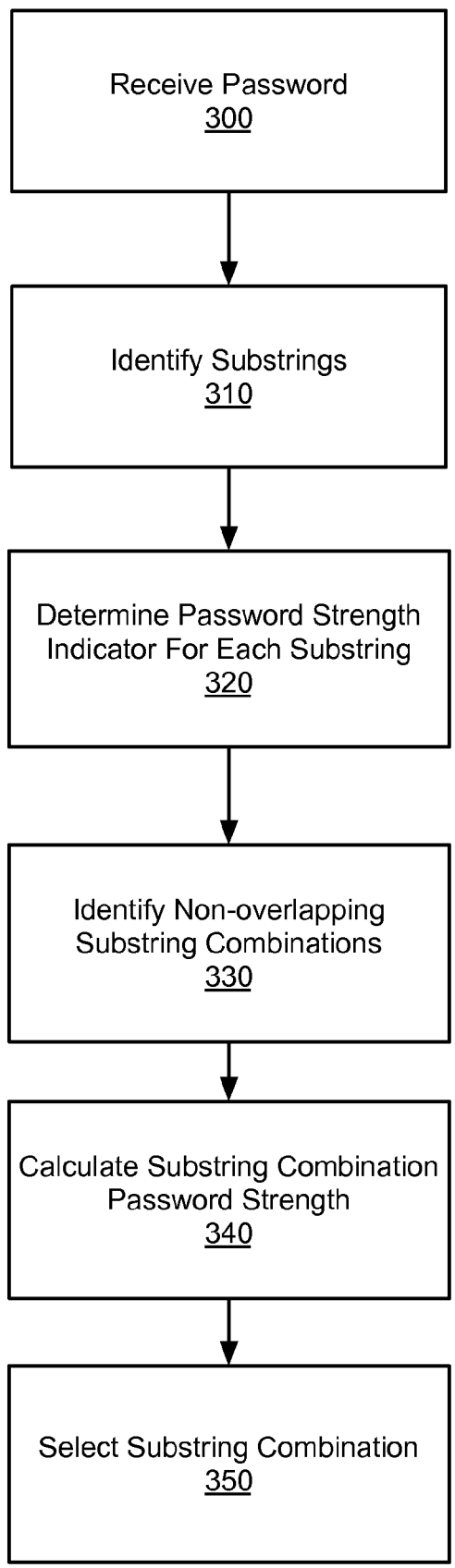
FIG. 3 illustrates a method for evaluating the strength of a password according to one embodiment.

FIG. 3 illustrates a method for evaluating the strength of a password according to one embodiment. The method is performed in one embodiment by account management system 100. The method receives a password (300) for evaluation. Next, the method identifies substrings (310) within the password, as described above. The substrings identified in the password may be dictionary words, common passwords, common names, keyboard patterns, and other types of patterns. The identified substrings may overlap portions of the original password. Next, the substring strength measure for each substring is determined (320) according to a substring strength determination for the pattern that can be used to generate the substring. Substring strength determination methods are described above with respect to scoring module 210. Next, using the substrings, non-overlapping substring combinations, which together make up the password, are identified (330). An additional combination strength measure is calculated (340) to determine the combination strength for the substring combinations as described above. The combination strength is based on the substring strength of the constituent substrings in each substring combination, and may include an additional combination strength indication based on the arrangement of the substrings within the combination. The substring combination that has the minimum combination strength is selected (350) to represent the password strength of the password. Thus, the combination strength of the weakest substring combination represents the password strength measure of the password as a whole.

Password Strength Example

FIG. 4 illustrates the processing of a password 400 to determine the password strength according to one embodiment. The password 400 is provided to substring identification module 200. The substring identification module 200 parses the password 400 to identify substrings within the password and whether the substrings correspond to substrings that are generated by various patterns. In this example, the substring identification module 200 identifies substrings corresponding to patterns of words 410, digits 411, a date 412, and adjacent keypad keys 413. The recognition of patterns in the password may be identified in a way that provides overlapping substrings. For example, "Gr33nl@nd" is parsed to create substrings "Gr33nl@nd," "Gr33n," and "l@nd." In addition, the digits at the end of this password 400 are parsed to determine two separate adjacent key substrings 413 as well as a digits substring 411 and a date substring 412 which overlap in characters. The example substrings illustrated in this figure are not exhaustive. For example, the system may additionally identify further substrings for the digits, such as a digits substring 411, which includes all of the digits "19756987." For illustrative purposes such substrings have not been included in this figure.

The system may further provide methods to trim substrings that are inferior to other substrings. For example, the entire password may be parsed as a substring that may be created by a brute-force pattern. Since other substrings are identified in the password that can be generated by other patterns, an adversary may identify the password more readily by using the other patterns rather than a brute-force pattern of the entire password length. These dominated substrings (which are inferior to other identified substrings) are trimmed in one embodiment after the pattern identification module 200 identifies the patterns that can generate the substrings.

The identified patterns are processed by scoring module 210 and assigned a substring strength as illustrated in brackets. The substring strength measures are associated with the substrings 420-423. The substring strength measures provided here are not representative of actual password strength indications and are displayed for illustration only. Next, the substring combination module 220 combines the substrings to yield specific substring combinations 430-433 which together form the original password and calculates a combination strength for each substring combination. The combination strength indications are used to determine the password strength for the password 400. In this example, the substring combination 430 of word of "Gr33nl@nd" with date of "1975" and adjacent keys of "6987" provide the lowest combination strength measure. The combination strength of pattern combination 430 is used to indicate the password strength of the password 400.

Password Recommendations Based on Password Strength

Using the estimated password strength, and identified patterns, the account management system may take various actions. The system may report the password strength to the user with the indication of the password strength. The password strength indicator may also be used to calculate an estimated time for an adversary to identify the password through attempted guesses. The estimated time to identify the password may be presented to the user. The password strength measure or time to identify the password may also be used to provide a generalized score to the user describing the password's strength, such as "poor," "good," or "great."

The account management system 100 may also provide specific recommendations to the user for enhancing the user's password based on the content of the password. For example, a user may input a password that uses two long but weak words, such as "passwordkitchen." The system may identify the password as a common password, "password," and a common dictionary word, "kitchen." Though long, this password is easy to guess by an adversary using a {common password, dictionary pattern} generation. The system may suggest particular improvements to the password. For example, the system may provide the user an identification of the reasons the password was not strong. The system may also provide the user a suggestion to modify the words or add a new password type to improve the password's entropy. The password type may be based on the patterns the user entered. A user with a {password, dictionary word} password may be suggested to add a keyboard pattern or to substitute unusual characters in the common words.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for evaluating the strength of a password, the method comprising:
   determining, by a processor, at least one pattern corresponding to a substring of a password, the password including a string of characters, a substring comprising a portion of the string of characters, and for the at least one pattern, determining a total number of different substrings that can be generated from the at least one pattern;
   identifying one or more combinations of substrings, each combination of substrings including at least one non-overlapping substring that forms a combination string of characters identical to the string of characters included in the password;
   determining, by the processor, for each combination of substrings a measure of entropy for the combination based at least in part on the total number of different substring combinations that can be generated from the at least one pattern; and
   determining as a password strength measure for the password a lowest measure of entropy of the substring combinations.

2. The computer-implemented method of claim 1, further comprising determining, by the processor, whether to accept the password based on the password strength measure.

3. The computer-implemented method of claim 1, further comprising:
   suggesting at least one pattern to a user to strengthen the password.

4. The computer-implemented method of claim 1, wherein at least one pattern comprises a dictionary word.

5. The computer-implemented method of claim 4, wherein the measure of entropy of the dictionary word is determined based on a frequency rank of the dictionary word.

6. The computer-implemented method of claim 4, wherein the at least one pattern comprising a dictionary word contains a substitution of characters in the dictionary word.

7. The computer-implemented method of claim 1, wherein at least one pattern comprises a keyboard pattern.

8. The computer-implemented method of claim 7, wherein the keyboard pattern comprises a length and at least one of a number of turns or a number of capitalizations.

9. The computer-implemented method of claim 8, wherein the keyboard pattern further comprises an adjacency score.

10. The computer-implemented method of claim 7, wherein determining a measure of entropy is further based on an average number of adjacent keys for a keyboard.

11. A system for evaluating the strength of a password, the system comprising:
- at least one processor operatively coupled to a network connection;
- memory operatively coupled to the at least one processor; and
- wherein the at least one processor is configured to:
  - determine at least one pattern corresponding to a substring of a password, the password including a string of characters, a substring comprising a portion of the string of characters, and for the at least one pattern, determining a total number of different substrings that can be generated from the at least one pattern;
  - identify one or more combinations of substrings, each combination of substrings including at least one non-overlapping substring that forms a combination string of characters identical to the string of characters included in the password;
  - determine, for each combination of substrings, a measure of entropy for the combination based at least in part on the total number of different substring combinations that can be generated from the at least one pattern; and
  - determine as a password strength measure for the password a lowest measure of entropy of the substring combinations.

12. The system of claim 11, wherein the at least one processor is further configured to determine whether to accept the password based on the password strength measure.

13. The system of claim 11, wherein the at least one processor is further configured to suggest at least one pattern to a user to strengthen the password.

14. The system of claim 11, wherein at least one pattern comprises a dictionary word.

15. The system of claim 11, wherein at least one pattern comprises a keyboard pattern.

* * * * *